(12) United States Patent
Logunov et al.

(10) Patent No.: US 12,522,533 B2
(45) Date of Patent: Jan. 13, 2026

(54) METHODS OF FORMING LASER-INDUCED ATTRIBUTES ON GLASS-BASED SUBSTRATES USING MID-IR LASER

(71) Applicant: CORNING INCORPORATED, Corning, NY (US)

(72) Inventors: Stephan Lvovich Logunov, Corning, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1674 days.

(21) Appl. No.: 16/462,092

(22) PCT Filed: Nov. 15, 2017

(86) PCT No.: PCT/US2017/061743
§ 371 (c)(1),
(2) Date: May 17, 2019

(87) PCT Pub. No.: WO2018/093857
PCT Pub. Date: May 24, 2018

(65) Prior Publication Data
US 2020/0277225 A1 Sep. 3, 2020

Related U.S. Application Data

(60) Provisional application No. 62/424,227, filed on Nov. 18, 2016.

(51) Int. Cl.
*C03C 23/00* (2006.01)
*C03C 4/00* (2006.01)

(52) U.S. Cl.
CPC ........ *C03C 23/0025* (2013.01); *C03C 4/0071* (2013.01); *C03C 2201/32* (2013.01); *C03C 2201/50* (2013.01); *C03C 2203/52* (2013.01)

(58) Field of Classification Search
CPC ................... C03C 23/0025; C03C 4/0071
See application file for complete search history.

(56) References Cited

U.S. PATENT DOCUMENTS 4,769,310 A * 9/1988 Gugger ................... B44C 1/005
427/555
5,902,665 A * 5/1999 Kuroda .................. C03C 3/087
428/64.2

(Continued)

FOREIGN PATENT DOCUMENTS

CN 1871182 A 11/2006
EP 0233146 A1 8/1987

(Continued)

OTHER PUBLICATIONS

Pltnichenko et al, "Hydroxyl groups in high-purity silica glass", 2000, Journal of Non-Crystalline Solids. 261. 186-194 (Year: 2000).*

(Continued)

*Primary Examiner* — Alison L Hindenlang
*Assistant Examiner* — Steven S Lee
(74) *Attorney, Agent, or Firm* — Svetlana Z. Short

(57) ABSTRACT

Methods of making a glass-based article including a surface feature thereon. Methods include arranging a glass-based substrate relative to a laser. Methods also include irradiating the glass-based substrate with laser beam with a light wavelength from about 2500 nm to about 3000 nm to grow a surface feature thereon.

21 Claims, 3 Drawing Sheets

(56) References Cited

U.S. PATENT DOCUMENTS

| | | | |
|---|---|---|---|
| 6,132,843 A * | 10/2000 | Kuroda | G11B 5/8404 |
| | | | 428/338 |
| 6,268,979 B1 * | 7/2001 | Kuroda | C03C 17/3649 |
| 6,548,176 B1 * | 4/2003 | Gwo | C03C 27/06 |
| | | | 206/568 |
| 6,576,863 B1 | 6/2003 | Piltch et al. | |
| 8,148,179 B2 | 4/2012 | Aitken et al. | |
| 8,397,537 B2 | 3/2013 | Grzybowski et al. | |
| 8,616,023 B2 | 12/2013 | Grzybowski et al. | |
| 9,515,286 B2 | 12/2016 | Dabich, II et al. | |
| 10,297,787 B2 | 5/2019 | Dejneka et al. | |
| 2001/0011465 A1 * | 8/2001 | Seward, III | C03C 23/0025 |
| | | | 65/17.6 |
| 2002/0041323 A1 * | 4/2002 | Hayashi | G02B 5/1871 |
| | | | 359/566 |
| 2004/0206953 A1 | 10/2004 | Morena et al. | |
| 2005/0029240 A1 | 2/2005 | Dugan et al. | |
| 2005/0176572 A1 * | 8/2005 | Hosono | C03B 19/1453 |
| | | | 501/54 |
| 2007/0004579 A1 * | 1/2007 | Bookbinder | C03C 4/0071 |
| | | | 65/111 |
| 2007/0201797 A1 * | 8/2007 | Grzybowski | G02B 6/4226 |
| | | | 385/52 |
| 2009/0130388 A1 * | 5/2009 | Streltsov | G02B 6/4219 |
| | | | 156/60 |
| 2009/0291261 A1 * | 11/2009 | Hidaka | B23K 26/40 |
| | | | 428/156 |
| 2010/0050692 A1 * | 3/2010 | Logunov | C03C 15/00 |
| | | | 65/31 |
| 2010/0107525 A1 * | 5/2010 | Grzybowski | C03B 23/0086 |
| | | | 52/204.591 |
| 2010/0183846 A1 * | 7/2010 | Grzybowski | C03C 23/007 |
| | | | 428/156 |
| 2010/0206006 A1 * | 8/2010 | Grzybowski | C03B 23/0307 |
| | | | 65/102 |
| 2011/0039072 A1 * | 2/2011 | Grzybowski | C03B 23/02 |
| | | | 428/156 |
| 2011/0100058 A1 * | 5/2011 | Dickinson, Jr. | C03B 23/02 |
| | | | 65/104 |
| 2012/0100318 A1 | 4/2012 | Danzl et al. | |
| 2012/0247063 A1 * | 10/2012 | Grzybowski | C03C 23/005 |
| | | | 52/786.13 |
| 2016/0031755 A1 * | 2/2016 | Hoppe | C03C 23/007 |
| | | | 65/117 |
| 2016/0268541 A1 | 9/2016 | Dabich, II et al. | |
| 2016/0280594 A1 * | 9/2016 | Muehlke | B23K 26/355 |
| 2017/0219826 A1 | 8/2017 | Haseltine et al. | |
| 2017/0327419 A1 | 11/2017 | Boek et al. | |

FOREIGN PATENT DOCUMENTS

| | | | | |
|---|---|---|---|---|
| JP | H09194229 A | * | 7/1997 | C03C 23/0025 |
| JP | 2003073148 A | * | 3/2003 | C03C 23/0025 |
| JP | 2004352560 A | * | 12/2004 | C03C 23/0025 |
| WO | WO-2015164241 A1 | * | 10/2015 | B23K 26/0869 |
| WO | 2016/069822 A1 | | 5/2016 | |

OTHER PUBLICATIONS

Plotnichenko, V. G. et al. Hydroxyl Groups in High-Purity Silica Glass, 2000, Inorganic Materials, vol. 36, No. 4 pp. 404-410, (Year: 2000).*

Orlovskiy et al., Neutron irradiation of modern KU-1 and KS-4V fused silica, Journal of Nuclear Materials, vol. 442, Issues 1-3, Supplement 1 (Year: 2013).*

De Jong, B.H.W.S., Beerkens, R.G.C. and van Nijnatten, P.A. (2000). Glass. In Ullmann's Encyclopedia of Industrial Chemistry, (Ed.). https://doi.org/10.1002/14356007.a12_365 (Year: 2000).*

International Search Report and Written Opinion of the International Searching Authority; PCT/US2017/061743; Mailed Jan. 26, 2018; 10 Pages; European Patent Office.

Plotnichenko et al; "Hydroxyl Groups in High-Purity Silica Glass"; Journal of Non-Crystalline Solids, 261 (2000) pp. 186-194.

Veiko et al; "Laser Fabrication of MOC Based on Soft Laser Heating of Glass and Glass-Like Materialss"; Proceedings of SPIE; pp. 159-167; 1993.

Chinese Patent Application No. 201780071336.9, Office Action dated Jun. 2, 2021; 13 pages (English Translation only); Chinese Patent Office.

* cited by examiner

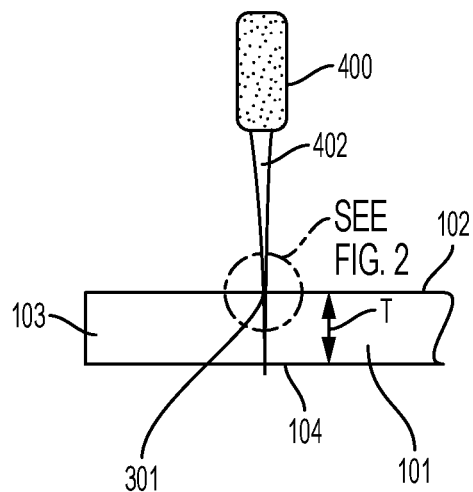
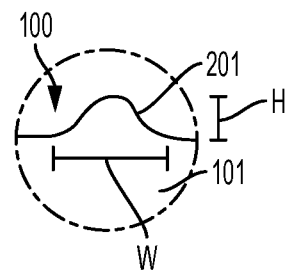
FIG. 1          FIG. 2
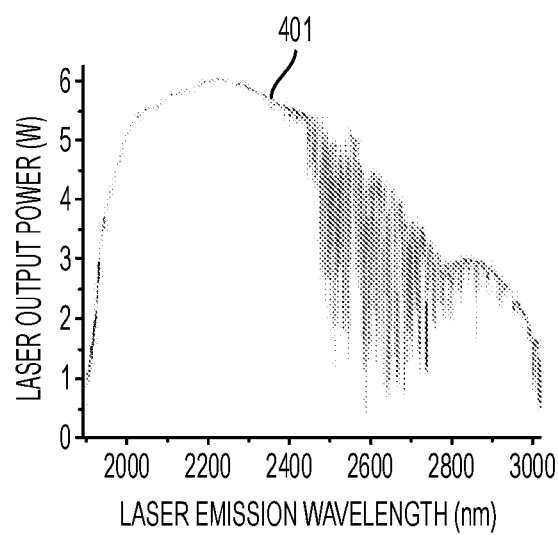
FIG. 3

METHODS OF FORMING LASER-INDUCED ATTRIBUTES ON GLASS-BASED SUBSTRATES USING MID-IR LASER

This application claims the benefit of priority under 35 U.S.C. § 371 of International Application No. PCT/US17/61743, filed on Nov. 15, 2017, which claims the benefit of priority under 35 U.S.C. § 119 of U.S. Provisional Application Ser. No. 62/379,429 filed on Aug. 25, 2016 the content of which is relied upon and incorporated herein by reference in its entirety.

BACKGROUND

The present disclosure relates to methods of forming laser-induced features on glass-based substrates using a mid-IR emitting laser.

Methods of forming laser-induced features on transparent glass-based substrates has been the subject of considerable research in recent years because of the potential for forming desired surface properties on glass-based substrates. Conventional methods have sometimes included directing ultraviolet (UV) wavelengths or $CO_2$ lasers onto opaque or transition metal containing glass-based substrates to form surface features thereon. These conventional methods have been unable to form laser-induced surface features on transparent glass-based substrates with low transition metal concentrations.

Accordingly, a need exists for a method forming laser-induced features on transparent glass-based substrates using a mid-IR emitting laser.

SUMMARY

According to an embodiment of the present disclosure, a method for forming a feature on a glass-based article is disclosed. In embodiments, the method includes arranging a substrate relative to a laser. In embodiments, the method includes directing a laser beam comprising a light wavelength from about 2500 nm to about 3000 nm from the laser to the substrate. In embodiments, the substrate absorbs light from the laser beam in an amount sufficient to heat and grow a feature from the substrate.

According to an embodiment of the present disclosure, a method for forming a feature on a glass-based article is disclosed. In embodiments, the method includes positioning a substrate relative to a laser. In embodiments, the method includes irradiating a surface of the substrate with a laser beam from the laser. In embodiments, the laser beam comprises a light wavelength from about 2500 nm to about 3000 nm. In embodiments, the substrate absorbs light from the laser beam in an amount sufficient to heat and grow a surface feature from the substrate.

In embodiment a glass-based article is disclosed. In embodiments, the substrate includes a surface and a laser-induced feature. In embodiments, the substrate absorbs a light wavelength from about 2500 nm to about 3000 nm. In embodiments, the laser-induced feature is on the surface of the substrate.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE FIGURES

The disclosure will be better understood, and features, aspects and advantages other than those set forth above will become apparent when consideration is given to the following detailed description thereof. Such detailed description makes reference to the following drawings, wherein:

FIG. 1 illustrates laser irradiation of glass-based substrate according to an embodiment of the present disclosure.

FIG. 2 illustrates an example surface feature on a glass-based substrate is formed according methods of the present disclosure.

FIG. 3 is a plot of a laser tuning curve (laser output power (in Watts) as a function of the laser emission wavelength (nm)) for a laser in accordance with the present disclosure.

DETAILED DESCRIPTION

Figure 4:
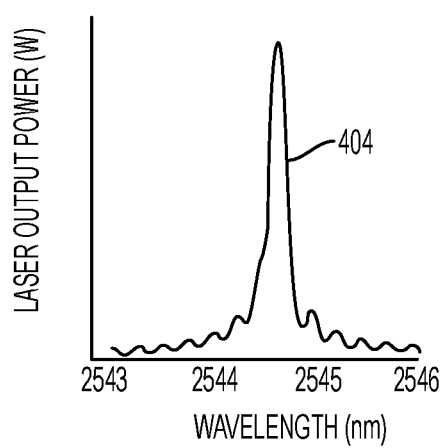
FIG. 4 is a plot of a laser emission spectrum (W) as a function of the laser emission wavelength (nm) for an example configuration of the laser within the laser turning curve of FIG. 3.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

The present disclosure provides methods of forming a glass-based article 100. In embodiments, glass-based article 100 includes a glass-based substrate 101 and a feature 201 formed on glass-based substrate 101. Glass-based substrate 101 may include a glass, a ceramic, and/or a glass-ceramic. In embodiments, glass-based article 100 is transparent. In embodiments, glass-based article 100 is colorless. Methods of the present disclosure include forming feature 201 on glass-based substrate 101. FIGS. 1A-B illustrate an example method of forming article 100. As shown in FIG. 1, methods of the present disclosure include arranging or positioning glass-based substrate 101 relative to a laser 400. Glass-based substrate 101 shown in FIGS. 1A-B includes a thickness T between opposite major surfaces 102, 104, and at least one edge 103. Glass-based substrate 101 may have any shape such as that of a pane, an optical fiber, a rod, a tube, a lens, a mirror, an ingot, a shield, or a filter. Glass-based substrate 101 may also be directly or indirectly coextensive with another glass substrate, such as in a glass-based laminate. Glass-based substrate 101 in FIGS. 1A-B is shown as substantially flat for illustration purposes only. Of course, glass-based substrate 101 can be flat, curved, rounded, circular, cylindrical, or other shapes typical of glass-based substrates. Of course, glass-based article 100 may include any number of features 201, such as 2, 3, 5, 10, 15, 20, 25, 50, 75, 100 or more features.

Glass-based substrates of the present disclosure transmit at least a portion of visible wavelengths. In embodiments, glass-based substrates of the present disclosure transmit at least a portion of wavelengths from about 400 nm to about 750 nm. In embodiments, glass-based substrates of the present disclosure transmit about 40% or more of wavelengths from about 400 nm to about 750 nm, or about 60% or more, or about 80% or more, such as 40%, 50%, 60%, 70%, 80%, 85%, 90% or more, including all ranges and subranges therebetween, of wavelengths from about 400 nm to about 750 nm. Visible light transmission (Tvis) at each wavelength from about 400 nm to about 750 nm may not be the same. In embodiments, glass-based substrates of the present disclosure are non-crystalline, inorganic amorphous solids. In embodiments, glass-based substrates of the present disclosure are transparent. In embodiments, glass-based substrates of the present disclosure are colorless. Glass-based substrate 101 may have a coefficient of thermal expansion (CTE) from about $0.1 \times 10^{-6\circ}$ $C.^{-1}$ to about $10 \times 10^{-6\circ}$ $C.^{-1}$ (at about 25° C. to about 400° C.).

Referring back to FIG. 1, methods of the present disclosure include arranging or positioning glass-based substrate 101 relative to laser 400. In embodiments, glass-based substrate 101 is arranged relative to laser 400 such that one of major surfaces 102, 104 are substantially orthogonal to a laser beam 402 generated from laser 400. In embodiments, one or both of major surfaces 102, 104 of glass-based substrate 101 is positioned at an angle less than 90 degrees with respect to laser beam 402 generated from laser 400.

Referring to FIG. 1, methods of the present disclosure may include providing or directing a laser beam 402 from laser 400 to contact glass-based substrate 101. In embodiments, laser beam 402 has a wavelength from about 2500 nm to about 3000 nm, or from about 2600 nm to about 2900 nm, or from about 2700 nm to about 2800 nm, such as 2500 nm, 2600 nm, 2700 nm, 2800 nm, 2900 nm, or 3000 nm, including all ranges and subranges therebetween. In embodiments, laser beam 402 includes a range of light wavelengths from about 2500 nm to about 3000 nm, or from about 2600 nm to about 2900 nm, or from about 2700 nm to about 2800 nm, such as 2500 nm, 2600 nm, 2700 nm, 2800 nm, 2900 nm, or 3000 nm, including all ranges and subranges therebetween. The wavelengths of laser beam 402 may be predetermined to coincide with an absorbing spectrum of glass-based substrate 101. That is, the output wavelengths and power from laser beam 402 may be configured to be selectively absorbed by glass-based substrate 101. In embodiments, the wavelengths of laser beam 402 are predetermined to coincide with the absorbance by a hydroxyl (—OH) concentration within the composition of glass-based substrate 101. Absorbance by glass-based substrate 101 herein is not photo-induced adsorption conventionally seen in ultraviolet (UV) laser irradiation processes.

Methods of the present disclosure may include irradiating one of surfaces 102, 104 of glass-based substrate 101 with laser beam 402 from laser 400. Laser beam 402 may be directed from laser 400 through a lens (optional) or series of lenses (optional) onto glass-based substrate 101. Directing laser beam 402 onto glass-based substrate 101 is also referred to as "laser irradiation" herein. Laser irradiation is provided in an amount sufficient to heat and grow glass feature 201 from glass-based substrate 101. The amount or dose of laser irradiation is a function of the laser power output and the time of irradiation. In embodiments, because the present methods do not require photo-induced adsorption, glass-based substrate 101 absorbs light from laser beam 402 in an amount sufficient to immediately heat and grow glass feature 201 therein. That is, growth of glass feature 201 may not include a time delay upon laser irradiation of substrate 101 with laser beam 402 because photo-induced adsorption is not the mechanism for glass feature 201 growth.

Laser 400 may output mid-infrared wavelengths. Laser 400 may output a wavelength range from about 1900 nm to about 3000 nm, or from about 2500 nm to about 3000 nm, or from about 2600 nm to about 2900 nm, or from about 2700 nm to about 2800 nm, such as 1900 nm, 2000 nm, 2100 nm, 2200 nm, 2300 nm, 2400 nm, 2500 nm, 2600 nm, 2700 nm, 2800 nm, 2900 nm, or 3000 nm, including all ranges and subranges therebetween. FIG. 3 provides an example laser 400 tuning curve 401 according to embodiments. FIG. 4 provides an example laser emission spectrum curve 404 for a specifically tuned laser 400 defined within tuning curve 401 in FIG. 3. The laser emission spectrum in FIG. 4 has a full width at half maximum (FWHM) of about <0.5 nm according to embodiments. Laser 400 may have a power output from about 0.1 W to about 100 W, or from about 1 W to about 50 W, or from about 5 W to about 30 W, such as 1, 2, 3, 4, 5, 6, 7, 8, 9, 10, 11, 12, 13, 14, 15, 16, 17, 18, 19, or 20 W or more, including all ranges and subranges therebetween. Laser 400 may include a crystal including chromium (Cr):zinc sulfide (ZnS)/selenide (Se) or a crystal including chromium (Cr):zinc selenide (ZnSe)/sulfur (S). In embodiments, laser 400 may be a continuous wave laser. Laser 400 may be a CL, CLT, or similar series laser from IPG Photonics® or other laser manufacturing companies. In embodiments, laser 400 may be an optical parametric amplifier (e.g., from Coherent Inc.). Laser 400 of the present disclosure is not a short-pulse laser (e.g., with pulsed durations less than 100 picoseconds).

Figure 5:
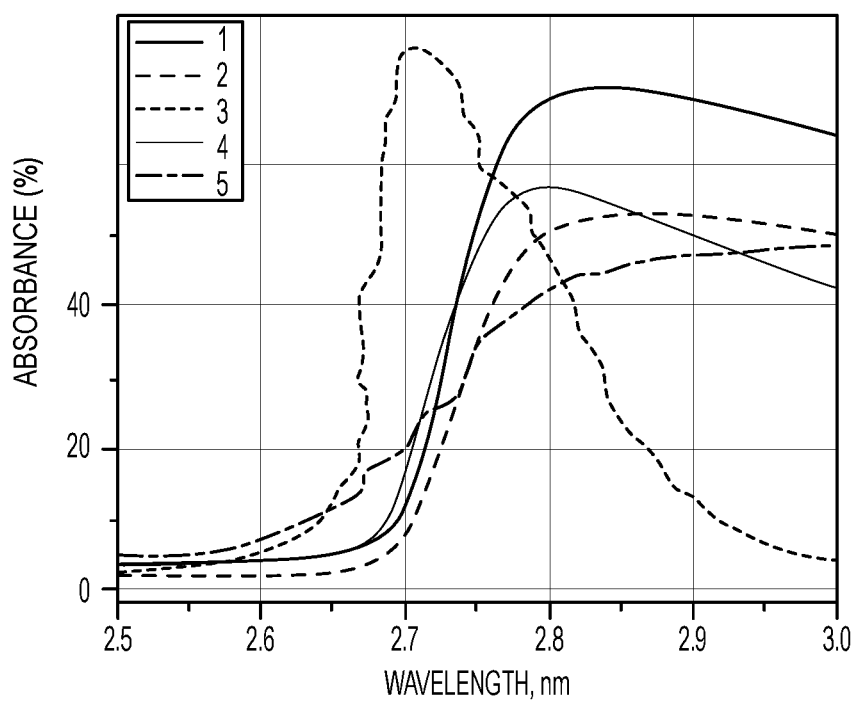
FIG. 5 is a plot of absorbance curves (%) for wavelengths from about 2500 nm to about 3000 nm for various glass substrates according to the present disclosure.

During laser irradiation, glass-based substrate 101 absorbs light of laser beam 402. That is, glass-based substrate 101 is substantially opaque (and therefore absorbing) to wavelengths within laser beam 402. In embodiments glass-based substrate 101 absorbs light from laser beam 402 in an amount sufficient to heat and grow glass feature 201 from glass-based substrate 101. Glass-based substrate 101 herein absorbs at least a portion of wavelengths from laser beam 402. In embodiments, glass-based substrate 101 absorbs at least about 20% or more, or even 30% or more, of wavelengths from about 2500 nm to about 3000 nm, or from about 2600 nm to about 2900 nm, or even from about 2700 nm to about 2800 nm, such as 2500 nm, 2600 nm, 2700 nm, 2800 nm, 2900 nm, or 3000 nm, including all ranges and subranges therebetween. In embodiments, glass-based substrate 101 absorbs at least about 50% or more of wavelengths from about 2600 nm to about 2900 nm, or even from about 2700 nm to about 2800 nm, such as 2600 nm, 2700 nm, 2800 nm, or 2900 nm, including all ranges and subranges therebetween. In embodiments, glass-based substrate 101 absorbs at least about 90% or more of wavelengths from about 2700 nm to about 2800 nm. FIG. 5 provides a plot of 5 absorbance curves (from about 2500 nm to about 3000 nm) for various glasses for glass-based substrate 101 according to the present disclosure. Lines 1 and 2 are absorbance curves for example alkali-aluminoborosilicate glasses in accordance with the present disclosure. Line 3 is an absorbance curve for an example fused silica glass in accordance with the present disclosure. Line 4 is an absorbance curve for an example aluminoborosilicate glass in accordance with the present disclosure. Line 5 is an absorbance curve for an example soda-lime glass in accordance with the present disclosure.

When contacted with laser beam 402 at a location 301, glass-based substrate 101 absorbs wavelengths from laser beam 402, is locally heated at a location 301, and grows laser-induced surface feature 201 from the body of glass-based substrate 101. That is, glass-based substrate 101 is locally heated at a location 301 (and through at least a portion of thickness T below location 101) when contacted with laser beam 402. The surface feature 201 begins to form as a limited expansion zone created within glass-based substrate 101 in which a rapid temperature change induces an expansion of the glass contiguous location 301 in glass-based substrate 101. Since the expansion zone contiguous location 301 is constrained by unheated (and therefore unexpanded) regions of glass surrounding the expansion zone, the molten glass within the expansion zone is compelled to relieve internal stresses by expanding/flowing upward, thereby forming surface feature 201.

FIG. 2 illustrates surface feature 201 grown on glass-based substrate 101. Surface feature 201 is comprised of glass from glass-based substrate 101. In embodiments, surface feature 201 has the same glass composition as glass-based substrate 101. Surface feature 201 is a laser-induced surface feature. Surface feature 201 may have a height on glass-based substrate 101 from about 0.01 micrometers to about 1 mm, or from about 0.01 micrometers to about 500 micrometers, or even from about 50 micrometers to about 250 micrometers. In embodiments, the height H of surface feature 201 is distinguishable from thickness T of glass-based substrate 101. Surface feature 201 may have a width W on glass-based substrate 101 from about 0.01 micrometers to about 1 mm, or from about 0.01 micrometers to about 700 micrometers, or even from about 90 micrometers to about 250 micrometers. The width W of surface feature 201 is measured from opposite locations where sides of feature 201 join with surface 102 or 104 of glass-based substrate 101.

In embodiments, surface feature 201 is localized to an area on glass-based substrate 101. In embodiments, surface feature 201 is on a fraction of the surface area of glass-based substrate 101. In embodiments, surface feature 201 is transparent. In embodiments, surface feature 201 transmits at least a portion of visible wavelengths. In embodiments, surface feature 201 transmits at least a portion of wavelengths from about 400 nm to about 750 nm. In embodiments, surface feature 201 transmits about 40% or more of wavelengths from about 400 nm to about 750 nm, or about 60% or more, or about 80% or more, such as 40%, 50%, 60%, 70%, 80%, 90% or more, including all ranges and subranges therebetween, of wavelengths from about 400 nm to about 750 nm. In embodiments, surface feature 201 is colorless. Surface feature 201 may have any cross-sectional shape including semi-circular or parabolic (e.g., see FIG. 2) for example. Surface feature 201 may be a bump, a ridge, or a protrusion on glass-based substrate 101.

Glass-based substrate 101 may include a material (e.g., glass) that absorbs light from laser beam 402 in an amount sufficient to heat and grow surface feature 201 therefrom. Glass substrate 101 may include a material (e.g., glass) with a hydroxyl (—OH) concentration within its composition of 100 ppm or more, 200 ppm or more, 400 ppm or more, 800 ppm or more, 1000 ppm or more, such as 100, 200, 300, 400, 500, 600, 700, 800, 900, 1000, 1100 ppm or more, including all ranges and subranges therebetween. Hydroxyl (—OH) concentration of substrates herein may be determined by IR spectroscopy. Glass-based substrate 101 herein may include a soda-lime glass, an aluminosilicate glass, an alkali-aluminosilicate glass, a borosilicate glass, an alkali-borosilicate glass, an aluminoborosilicate glass, an alkali-aluminoborosilicate glass, or a fused silica glass. In embodiments, glass-based substrate 101 may include "wet" fused silica (e.g., Corning HPFS® 7980). Glass-based substrate 101 herein may include glass substrates from Corning Incorporated (e.g., Eagle XG®, Eagle 2000™, Willow®, etc.), Asahi Glass Co. (e.g., OA10, OA21, AQ Series, AQT Series, AQR Series, etc.), Nippon Electric Glass Co., NHTechno, Advanced Glass Industries, PEMCO, Samsung Corning Precision Glass Co., etc.

Glass-based substrate 101 may include a glass with a transition metal ion concentration of less than about 1.0 wt. %. Example transition metal ions include arsenic (Ar), antimony (Sb), tin (Sn), cerium (Ce), lead (Pb), titanium (Ti), copper (Cu), etc. In embodiments, glass-based substrate 101 includes a glass with a cumulative transition metal ion concentration of less than about 1.0 wt. %. In embodiments, glass-based substrate 101 is essentially free (e.g., <0.1 wt. %) of a transition metal ion concentration. Transition metal ions within glass compositions may have been used to enable photo-induced adsorption conventionally seen in ultraviolet (UV) laser irradiation processes. Thus, transition metal ions may not be required in glass-based substrate 101 used in methods herein.

In embodiments, glass-based substrate 101 may include a glass with an iron (Fe) ion concentration of less than about 1.0 wt. %. In embodiments, glass-based substrate 101 may include a glass with an iron (Fe) ion concentration of less than about 0.5 wt. %. In embodiments, glass-based substrate 101 is essentially free (e.g., <0.1 wt. %) of an iron (Fe) ion concentration. Iron ions within glass compositions may have been used to enable photo-induced adsorption conventionally seen in ultraviolet (UV) laser irradiation processes.

In embodiments, during laser irradiation of glass-based substrate 101, feature 201 grows on a surface 102, 104 of glass-based substrate 101 proximate laser beam 402 from laser 400. That is, glass surface feature 201 may be grown on the irradiated surface (102 or 104) of glass-based substrate 101. As shown in FIG. 1, surface feature 201 may be grown from substrate 101 on irradiated surface 102. One or both of major surfaces 102, 104 of substrate 101 may be laser irradiated more than one time to form a plurality of features 201 thereon. Of course, surface features 201 may be grown from substrate 101 on major surfaces 102, 104 opposite each other in the same or separate laser irradiation steps.

Methods of the present disclosure may also include moving or transitioning laser beam 402 along one of surfaces 102, 104 of glass-based substrate 101. That is, methods of forming transparent article 100 may include moving or transitioning laser beam 402 from an initial location to a final location within one of surfaces 102, 104 of glass-based substrate 101. Moving or transitioning laser beam 402 along one of surfaces 102, 104 of glass-based substrate 101 may form a ridged surface feature 201 with a length. In embodiments, laser beam 402 is a moved along a length to form a linear feature, a circular feature, a squared feature, a triangular feature, or ridged features of similar shape. Laser beam 402 may also be moved by adjusting a lens or series of lenses between the laser 400 and glass-based substrate 101. Laser beam 402 may be moved in any direction along one of surfaces 102, 104 to form any shaped feature on glass-based substrate 101.

Methods of the present disclosure may also include moving or transitioning laser 400 relative to glass-based substrate 101 or moving or transitioning the location of substrate 101 relative to laser 400. In embodiments a plurality of individual surface features 201 are formed on glass-based substrate 101 by pausing laser irradiation of glass-based substrate 101 between locations 301.

Methods of the present disclosure may also include terminating laser irradiation of a surface 102, 104 of glass-based substrate 101. Terminating laser irradiation may be accomplished by turning laser 400 off, blocking laser beam 402 from contacting glass-based substrate 101, or shuttering laser beam 402. Methods of the present disclosure may include terminating contact of laser beam 402 and glass-based substrate 101. Methods of the present disclosure may also include annealing transparent glass-based substrate 100 to alleviate or remove thermal stresses therein from laser irradiation.

Glass-based article 100 includes glass-based substrate 101 and a laser-induced surface feature 201 thereon. Glass-based article 100 may be included in an OLED display, a glass-based stack, a glass-based sandwich, a lens construct, a laminate, or an ophthalmic build. Glass-based article 100 may be used in stereolithography processes, cameras, ophthalmic equipment, electronic displays, electronic components, human wearable displays, windows (e.g., vacuum insulted glazing), telescopes, vehicles, spacecraft, satellites, telecommunication equipment, or the like. Glass-based article 100 may be transparent and/or colorless.

In embodiments, glass-based article 100 includes glass-based substrate 101 and laser-induced glass surface feature 201 thereon. In embodiments, glass-based substrate 101 is capable of absorbing at a wavelength from about 2500 nm to about 3000 nm. In embodiments, transparent glass-based article 100 is fused silica glass. In embodiments, the fused silica glass substrate 101 includes a hydroxyl (—OH) concentration within it composition greater than about 300 ppm.

Methods of making glass-based article 100 may include arranging glass-based substrate 101 relative to laser 400. Methods of making glass-based article 100 may include irradiating at least one of surfaces 102, 104, of glass-based substrate 101 with laser beam 402 from laser 400. In embodiments, laser beam 402 includes a light wavelength from about 2500 nm to about 3000 nm. In embodiments, glass-based substrate 101 absorbs light from laser beam 402 in an amount sufficient to heat and grow a glass surface feature 201 from glass-based substrate 101.

EXAMPLES

The present disclosure will be further clarified with reference to the following examples which are intended to be non-restrictive and illustrative only.

Example 1

In this example, a 30 Watt CL Series laser (available from IPG Photonics) having a chromium (Cr):zinc sulfide (ZnS)/selenide (Se) crystal was used to focus a continuous-wave laser beam 402 (with a laser emission spectrum curve 404 similar to that in FIG. 4) through a 20 mm singlet lens onto a glass substrate 101 at a plurality of discrete locations thereon to form surface features (e.g., glass bumps). Tables 1-3 below provide the dimensions for each surface feature formed on each of 3 different glass compositions. Table 1-3 also provide the laser settings used to grow said laser-induced features 201 on the glass substrates. Glass bumps 201 detailed below, grown on substrate 101, were transparent and colorless.

TABLE 1

Laser Irradiation of a Spot on Soda-lime Glass

| Laser | | | Glass Bump | | |
|---|---|---|---|---|---|
| Power | Wavelength | Exposure | # | Height (μm) | Width (μm) |
| 8 W | 2800 nm | 1 second | 1 | 67.5 | 192 |
|  | 2800 nm | 1 second | 2 | 69.5 | 192 |
| 10 W | 2800 nm | 1 second | 3 | 103.4 | 224 |
|  | 2800 nm | 1 second | 4 | 104.0 | 224 |
| 12 W | 2800 nm | 1 second | 5 | 96.4 | 378 |
|  | 2800 nm | 1 second | 6 | 95.7 | 372 |
| 14 W | 2800 nm | 1 second | 7 | 85.3 | 473 |
|  | 2800 nm | 1 second | 8 | 87.4 | 455 |
| 16 W | 2800 nm | 1 second | 9 | 81.7 | 585 |
|  | 2800 nm | 1 second | 10 | 81.2 | 585 |
| 24 W | 2723 nm | 1 second | 11 | 107.9 | 306 |
|  | 2723 nm | 1 second | 12 | 155.0 | 205 |

TABLE 2

Laser Irradiation of a Spot on Aluminoborosilicate Glass (Corning Eagle XG ®)

| Laser | | | Glass Bump | | |
|---|---|---|---|---|---|
| Power | Wavelength | Exposure | # | Height (μm) | Width (μm) |
| 10 W | 2800 nm | 1 second | 1 | 27.7 | 440 |
|  | 2800 nm | 1 second | 2 | 28.2 | 352 |
| 11 W | 2800 nm | 1 second | 3 | 24.3 | 432 |
| 12 W | 2800 nm | 1 second | 4 | 24.3 | 474 |
| 13 W | 2800 nm | 1 second | 5 | 31.2 | 516 |
|  | 2800 nm | 1 second | 6 | 22.9 | 493 |
| 14 W | 2800 nm | 1 second | 7 | 42.5 | 619 |
|  | 2800 nm | 1 second | 8 | 45.3 | 671 |
| 15 W | 2800 nm | 1 second | 9 | 56.5 | 620 |
|  | 2800 nm | 1 second | 10 | 58.1 | 640 |

TABLE 3

Laser Irradiation of a Spot on Fused Silica Glass (Corning HPFS ® 7980)

| Laser | | | Glass Bump | | |
|---|---|---|---|---|---|
| Power | Wavelength | Exposure | # | Height (μm) | Width (μm) |
| 20 W | 2750 nm | 1 second | 1 | 10 | 102 |
|  | 2750 nm | 1 second | 2 | 10 | 125 |
| 26 W | 2730 nm | 1 second | 3 | 52.3 | 171 |
|  | 2730 nm | 1 second | 4 | 33.7 | 149 |

Example 2

In this example, the same laser from Example 1 was used to focus a continuous-wave laser beam 402 (with a laser emission spectrum curve 404 similar to that in FIG. 4) through a 50 mm singlet lens onto the front of glass substrate 101 along a line to form surface features (e.g., glass ridges). The width of the laser beam 402 contacting substrate 101 was about 3 mm. Table 4 below provides the dimensions for each surface feature formed on each side (front and back relative to the laser) of the glass substrate. Table 4 also provides the laser settings used to grow said laser-induced feature 201 on the glass substrate. Glass ridges 201 detailed below, grown on glass substrates 101, were transparent and colorless.

TABLE 4

Laser Irradiation of a Line on Aluminoborosilicate Glass
(Corning Eagle XG ®)

| Laser | | | | Glass Bump | | | |
|---|---|---|---|---|---|---|---|
| Power | Wavelength | Speed | # | Front Height | Front Width | Back Height | Back Width |
| 7.8 W | 2800 nm | 0.78 mm/s | 1 | 17.5 μm | 248 μm | 8.3 μm | 246 μm |
|  | 2800 nm | 1.5 mm/s | 2 | 21.7 μm | 174 μm | 6.4 μm | 185 μm |
|  | 2800 nm | 3.0 mm/s | 3 | 17.0 μm | 100 μm | 0 μm | 96 μm |
| 16 W | 2800 nm | 0.78 mm/s | 3 | 21.2 μm | 160 μm | <1 μm | 160 μm |

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present disclosure without departing from the spirit and scope of the disclosure herein. Since modifications combinations, sub-combinations and variations of the disclosed embodiments incorporating the spirit and substance of the present disclosure may occur to persons skilled in the art, the present disclosure should be construed to include everything within the scope of the appended claims and their equivalents.

What is claimed is:

1. A method of forming a feature on a glass-based article, the method comprising:
    arranging a transparent glass-based substrate relative to a laser, the transparent glass-based substrate comprising a hydroxyl concentration within its composition of at least 100 ppm;
    directing a laser beam comprising a light wavelength from about 2500 nm to about 3000 nm from the laser to contact the transparent glass-based substrate; and
    moving the laser beam along a surface of the transparent glass-based substrate;
    wherein the transparent glass-based substrate absorbs light from the laser beam in an amount sufficient to heat and grow a glass feature from the transparent glass-based substrate;
    wherein the transparent glass-based substrate comprises an iron ion concentration of less than about 1.0 wt. %.

2. The method of claim 1, wherein the transparent glass-based substrate is essentially free of a transition metal ion concentration.

3. The method of claim 1, wherein the transparent glass-based substrate comprises an iron ion concentration of less than about 0.5 wt. %.

4. The method of claim 1, wherein the transparent glass-based substrate absorbs 20% or more of light from the laser beam.

5. The method of claim 1, wherein the glass feature grows on a surface of the transparent glass-based substrate proximate the laser beam from the laser.

6. The method of claim 1, wherein said method further comprises terminating contact of the laser beam and the transparent glass-based substrate.

7. The method of claim 1, wherein the transparent glass-based substrate comprises a soda-lime glass, an alumino-silicate glass, an alkali-aluminosilicate glass, a borosilicate glass, an alkali-borosilicate glass, an aluminoborosilicate glass, an alkali-aluminoborosilicate glass, or a fused silica glass.

8. The method of claim 1, wherein the hydroxyl concentration is greater than about 300 ppm.

9. The method of claim 1, wherein the glass feature is a bump, a ridge, or a protrusion on the glass-based substrate.

10. A method of forming a glass-based feature on a glass-based article, the method comprising:
    positioning a transparent glass-based substrate relative to a laser;
    irradiating a surface of the transparent glass-based substrate with a laser beam from the laser, the laser beam including a light wavelength predetermined to coincide with the absorbance by a hydroxyl concentration within the transparent glass-based substrate; and
    moving the laser beam across the surface by adjusting a lens between the laser and the glass-based substrate;
    wherein:
        the laser beam comprises a light wavelength from about 2500 nm to about 3000 nm;
        the transparent glass-based substrate absorbs light from the laser beam in an amount sufficient to heat and grow a transparent glass surface feature from the transparent glass-based substrate; and
        the transparent glass-based substance comprises a transition metal ion concentration of less than about 1.0 wt. %.

11. The method of claim 10, wherein the transparent glass surface feature is grown on the irradiated surface of the transparent glass-based substrate.

12. The method of claim 10, wherein the transparent glass-based substrate is fused silica and the hydroxyl concentration is greater than about 300 ppm.

13. The method of claim 10, wherein the transparent glass-based substrate comprises a soda-lime glass, an aluminosilicate glass, an alkali-aluminosilicate glass, a borosilicate glass, an alkali-borosilicate glass, an aluminoborosilicate glass, or an alkali-aluminoborosilicate glass.

14. The method of claim 13, wherein the transparent glass-based substrate is essentially free of a transition metal ion concentration.

15. The method of claim 13, wherein the transparent glass-based substrate comprises an iron ion concentration of less than about 0.5 wt. %.

16. The method of claim 13, wherein the transparent glass-based substrate absorbs about 30% or more of light from the laser beam.

17. The method of claim 10, said method further comprises terminating irradiation of the surface of the transparent glass-based substrate with the laser beam.

18. The method of claim 10, wherein the transparent glass-based substrate comprises a coefficient of thermal expansion (CTE) from about $0.1 \times 10^{-6}$ $°C.^{-1}$ to about $10 \times 10^{-6}$ $°C.^{-1}$ (at about 25° C. to about 400° C.).

19. The method of claim 10, wherein the transparent glass surface feature is a protrusion or a ridge on the transparent glass-based substrate surface.

20. The method of claim 10, wherein the transparent glass surface feature has a height of about 0.01 micrometers to about 500 micrometers on the transparent glass-based substrate surface.

21. A method of forming a feature on a glass-based article, the method comprising:
    arranging a transparent glass-based substrate relative to a laser, the transparent glass-based substrate comprising a hydroxyl concentration; and
    directing a laser beam comprising a light wavelength from the laser to contact the transparent glass-based substrate;
    wherein:
        the transparent glass-based substrate absorbs light from the laser beam in an amount sufficient to heat and grow a glass feature from the transparent glass-based substrate; and
        the light wavelength is predetermined to coincide with the absorbance by the hydroxyl concentration.

* * * * *